United States Patent
Biermann et al.

(10) Patent No.: US 6,490,997 B1
(45) Date of Patent: Dec. 10, 2002

(54) CAT CLIMBING AND SCRATCHING DEVICE

(76) Inventors: Joseph S. Biermann, # 6 Sante Fe Trails Ct., St. Peters, MO (US) 63376; Michael Biermann, 4100 Fillmore, St. Louis, MO (US) 63116

( * ) Notice: Subject to any disclaimer, the term of this patent is extended or adjusted under 35 U.S.C. 154(b) by 0 days.

(21) Appl. No.: 09/833,477

(22) Filed: Apr. 12, 2001

(51) Int. Cl.[7] ............................................. A01K 15/02
(52) U.S. Cl. ...................................................... 119/706
(58) Field of Search ........................ 119/702, 706–711; 446/227, 314, 476; D30/160

(56) References Cited

U.S. PATENT DOCUMENTS

| | | | |
|---|---|---|---|
| 2,143,592 A | | 1/1939 | Baldeck |
| D175,292 S | * | 8/1955 | Austgen ..................... 119/537 |
| 2,808,807 A | * | 10/1957 | Winton et al. .............. 119/468 |
| 3,479,990 A | | 11/1969 | Crow |
| 3,479,991 A | | 11/1969 | Lichtenberger |
| 3,595,209 A | | 7/1971 | Parker |
| D222,276 S | | 10/1971 | Hughes |
| 5,067,440 A | * | 11/1991 | Hatten et al. ............... 119/706 |
| D361,876 S | * | 8/1995 | Northrop et al. .......... D30/160 |
| 5,829,390 A | | 11/1998 | Jonilla et al. |
| 6,213,054 B1 | * | 4/2001 | Marshall ................... 119/57.8 |

* cited by examiner

Primary Examiner—Charles T. Jordon
Assistant Examiner—Kimberly S. Smith

(57) ABSTRACT

A cat climbing and scratching device for providing a scratching and perching area for cats. The cat climbing and scratching device includes a base. A pole has a first end coupled to the base such that the pole extends upwardly from the base. The pole is generally centered on the top surface of the base. A top wall has a bottom surface and a top surface. A second end of the pole is attached to the bottom surface of the top wall. A substantially rigid helical member is positioned around the pole and has a first end positioned adjacent to the top surface of the base and a second end positioned adjacent to the bottom surface of the top wall. Each of plurality of rods has a first end attached to the pole and a second end attached to the helical member. The rods are spaced from each other.

19 Claims, 1 Drawing Sheet

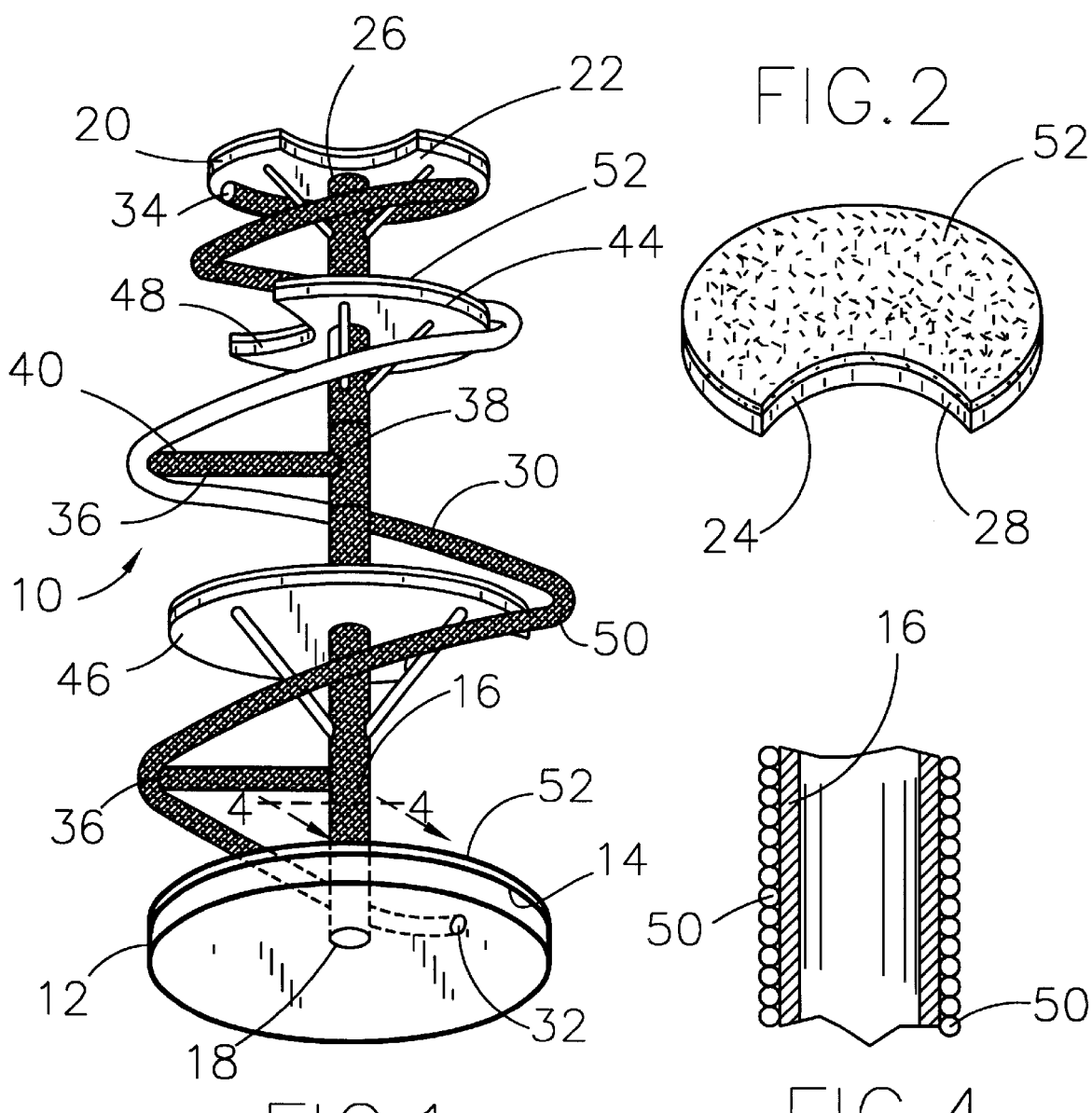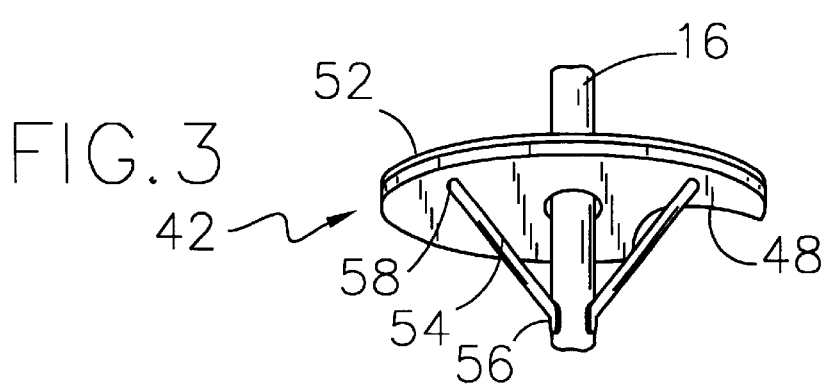

CAT CLIMBING AND SCRATCHING DEVICE

BACKGROUND OF THE INVENTION

1. Field of the Invention

The present invention relates to cat exercise devices and more particularly pertains to a new cat climbing and scratching device for providing a scratching and perching area for cats.

2. Description of the Prior Art

The use of cat exercise devices is known in the prior art. More specifically, cat exercise devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,479,990; 3,479,991; 5,829,390; U.S. Des. Patent No. 222,276; U.S. Pat. Nos. 3,595,209; and 2,143,592.

While these devices fulfill their respective, particular objectives and requirements, the aforementioned patents do not disclose a new cat climbing and scratching device. The inventive device includes a base having a generally circular shaped top surface. A pole has a first end coupled to the base such that the pole extends upwardly from the base. The pole is generally centered on the top surface of the base. A top wall has a bottom surface and a top surface. A second end of the pole is attached to the bottom surface of the top wall such that the top wall and the base are orientated generally parallel to each other. A helical member is positioned around the pole and has a first end positioned adjacent to the top surface of the base and a second end positioned adjacent to the bottom surface of the top wall. The helical member is substantially rigid. A plurality of rods each has a first end attached to the pole and a second end attached to the helical member, the rods is spaced from each other.

In these respects, the cat climbing and scratching device according to the present invention substantially departs from the conventional concepts and designs of the prior art, and in so doing provides an apparatus primarily developed for the purpose of providing a scratching and perching area for cats.

SUMMARY OF THE INVENTION

In view of the foregoing disadvantages inherent in the known types of cat exercise devices now present in the prior art, the present invention provides a new cat climbing and scratching device construction wherein the same can be utilized for providing a scratching and perching area for cats.

The general purpose of the present invention, which will be described subsequently in greater detail, is to provide a new cat climbing and scratching device apparatus and method which has many of the advantages of the cat exercise devices mentioned heretofore and many novel features that result in a new cat climbing and scratching device which is not anticipated, rendered obvious, suggested, or even implied by any of the prior art cat exercise devices, either alone or in any combination thereof.

To attain this, the present invention generally a base having a generally circular shaped top surface. A pole has a first end coupled to the base such that the pole extends upwardly from the base. The pole is generally centered on the top surface of the base. A top wall has a bottom surface and a top surface. A second end of the pole is attached to the bottom surface of the top wall such that the top wall and the base are orientated generally parallel to each other. A helical member is positioned around the pole and has a first end positioned adjacent to the top surface of the base and a second end positioned adjacent to the bottom surface of the top wall. The helical member is substantially rigid. A plurality of rods each has a first end attached to the pole and a second end attached to the helical member, the rods is spaced from each other.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cat climbing and scratching device apparatus and method which has many of the advantages of the cat exercise devices mentioned heretofore and many novel features that result in a new cat climbing and scratching device which is not anticipated, rendered obvious, suggested, or even implied by any of the prior art cat exercise devices, either alone or in any combination thereof.

It is another object of the present invention to provide a new cat climbing and scratching device which may be easily and efficiently manufactured and marketed.

It is a further object of the present invention to provide a new cat climbing and scratching device which is of a durable and reliable construction.

An even further object of the present invention is to provide a new cat climbing and scratching device which is susceptible of a low cost of manufacture with regard to both materials and labor, and which accordingly is then susceptible of low prices of sale to the consuming public, thereby making such cat climbing and scratching device economically available to the buying public.

Still yet another object of the present invention is to provide a new cat climbing and scratching device which provides in the apparatuses and methods of the prior art some of the advantages thereof, while simultaneously overcoming some of the disadvantages normally associated therewith.

Still another object of the present invention is to provide a new cat climbing and scratching device for providing a scratching and perching area for cats.

Yet another object of the present invention is to provide a new cat climbing and scratching device which includes a base having a generally circular shaped top surface. A pole has a first end coupled to the base such that the pole extends upwardly from the base. The pole is generally centered on the top surface of the base. A top wall has a bottom surface and a top surface. A second end of the pole is attached to the bottom surface of the top wall such that the top wall and the base are orientated generally parallel to each other. A helical member is positioned around the pole and has a first end positioned adjacent to the top surface of the base and a second end positioned adjacent to the bottom surface of the top wall. The helical member is substantially rigid. A plurality of rods each has a first end attached to the pole and a second end attached to the helical member, the rods is spaced from each other.

Still yet another object of the present invention is to provide a new cat climbing and scratching device that combines a perching area and a scratching pole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new cat climbing and scratching device according to the present invention.

FIG. 2 is a schematic perspective view of the top wall of the present invention.

FIG. 3 is a schematic perspective view of the present invention.

FIG. 4 is a schematic cross-sectional view taken along line 4—4 of FIG. 1 of the present invention.

DESCRIPTION OF THE PREFERRED EMBODIMENT

With reference now to the drawings, and in particular to FIGS. 1 through 4 thereof, a new cat climbing and scratching device embodying the principles and concepts of the present invention and generally designated by the reference numeral 10 will be described.

As best illustrated in FIGS. 1 through 4, the cat climbing and scratching device 10 generally includes a base 12 having a generally circular shaped top surface 14. The base 12 preferably has a diameter generally between 2 ½ feet and 3 feet.

A pole 16 has a first end 18 coupled to the base 12 such that the pole 16 extends upwardly from the base 12. The pole 16 has a longitudinal axis orientated generally perpendicular to a plane of the top surface 14 of the base 12 and extending through an axis of the base 12. The pole 16 preferably has a height equal to 6 feet.

A top wall 20 has a bottom surface 22 and a top surface 24. A second end 26 of the pole 16 is attached to the bottom surface 22 of the top wall 20 such that the top wall 20 and the base 12 are orientated generally parallel to each other. The pole 16 is generally centrally located with respect to the bottom surface 22 of the top wall 20. The top wall 20 has a peripheral edge having a notch 28 therein extending toward a central area of the top wall 20. The top wall 20 has a diameter generally between 1 foot and 2 feet.

A helical member 30 has a first end 32 positioned adjacent to the top surface 14 of the base 12 and a second end 34 positioned adjacent to the bottom surface 22 of the top wall 20. The helical member 30 is substantially rigid. The helical member 30 has a descending radius from the base 12 to the top wall 20.

Each of a plurality of rods 36 each has a first end 38 attached to the pole 16 and a second end 40 attached to the helical member 30. The rods 36 are spaced from each other.

Each of a plurality of intermediate walls 42 is positioned on the pole 16 between the top wall 20 and the base 12. The intermediate walls 42 are spaced from each other. Each of the intermediate walls 42 is generally disc shaped. The pole 16 extends through an axis of each of the intermediate walls 42. The intermediate walls 42 have a descending radius from lowermost to uppermost with respect to the base 12 such that the uppermost intermediate wall 44 has a diameter greater than the top wall 20 and the lowermost intermediate wall 46 has a diameter smaller than the base 12. The intermediate walls 42 each have a perimeter edge having a notch 48 therein. Each of the notches 48 extends to the pole 16. Preferably, there are two intermediate walls 42.

Cord 50 is wrapped about each of the rods 36, pole 16 and helical member 30 such that the cord 50 generally covers each of the rods 36, pole 16 and helical member 30. The cord 50 preferably comprises a fibrous rope material.

A covering 52 is attached to an substantially covers a top surface of the intermediate walls 42 and the top surfaces of the base 12 and top wall 16. The covering 52 comprises a fibrous material which is preferably a carpet material.

A plurality of supports 54 each comprises a bar having a first end 56 coupled to the pole 16 and a second end 58 attached to one of the intermediate walls 42 or the to wall 20 such that three of the supports 54 are coupled to each o the intermediate and top walls.

In use, the device is positioned such that cats may gain access to the device. Cats use the cord for scratching and the helical member and walls for perching on the device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size , materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A cat perching and scratching device comprising:

a base having a generally circular shaped top surface;

a pole having a first end coupled to said base such that said pole extends upwardly from said base, said pole being generally centered on said top surface of said base;

a top wall having a bottom surface and a top surface, a second end of said pole being attached to said bottom surface of said top wall such that said top wall and said base are orientated generally parallel to each other;

a helical member extending around said pole and having a first end positioned adjacent to said top surface of said base and a second end positioned adjacent to said bottom surface of said top wall, said helical member being substantially rigid; and a plurality of rods each having a first end attached to said pole and a second end attached to said helical member, said rods being spaced from each other.

2. The cat perching and scratching device as in claim 1, wherein said pole has a longitudinal axis orientated generally perpendicular to a plane of said top surface of said base and extending through an axis of said base.

3. The cat perching and scratching device as in claim 1, wherein said top wall has a peripheral edge having a notch therein extending toward a central area of said top wall.

4. The cat perching and scratching device as in claim 1, wherein said top wall has a smaller diameter than a diameter of said base.

5. The cat perching and scratching device as in claim 4, wherein said helical member has a descending radius from said base to said top wall.

6. The cat perching and scratching device as in claim 4, further including:

a plurality of intermediate walls positioned on said pole between said top wall and said base and being spaced from each other, each of said intermediate walls being generally disc shaped, said pole extending through an axis of each of said intermediate walls.

7. The cat perching and scratching device as in claim 6, wherein said intermediate walls have a descending radius from lowermost to uppermost with respect to said base such that said uppermost intermediate wall has a diameter greater than said top wall and said lowermost intermediate wall has a diameter smaller than said base.

8. The cat perching and scratching device as in claim 7, each of said intermediate walls having a perimeter edge having a notch therein, each of said notches extending toward said pole.

9. The cat perching and scratching device as in claim 1, further including:

a plurality of intermediate wall positioned on said pole between said top wall and said base and being spaced from each other, each of said intermediate walls being generally disc shaped, said pole extending through an axis of each of said intermediate walls.

10. The cat perching and scratching device as in claim 9, each of said intermediate walls having a perimeter edge having a notch therein, each of said notches extending toward said pole.

11. The cat perching and scratching device as in claim 10, further including:

cord being wrapped about each of said rods, pole and helical member such that said cord generally covers each of said rods, pole and helica member, said cord comprising a rope material.

12. The cat perching and scratching device as in claim 6, further including:

cord being wrapped about each said rods, pole and helical member such that said cord generally covers each of said rods, pole and helica member, said cord comprising a rope material.

13. The cat perching and scratching device as in claim 8, further including:

cord being wrapped about each said rods, pole and helical member such that said cord generally covers each of said rods, pole and helical member, said cord comprising a rope material.

14. The cat perching and scratching device as in claim 13, further including:

a covering being attached to and substantially covering a top surface of said intermediate walls and said top surfaces of said base and top wall, said covering comprising a fibrous material.

15. The cat perching and scratching device as in claim 4, further including:

a covering being attached to and substantially covering a top surface of said intermediate walls and said top surfaces of said base and top wall, said covering comprising a fibrous material.

16. The cat perching and scratching device as in claim 1, further including:

a covering being attached to an substantially covering a top surface of said intermediate walls and said top surfaces of said base and top wall, said covering comprising a fibrous material.

17. The cat perching and scratching device as in claim 16, a plurality of supports each comprising a bar having a first end coupled to the pole and a second end attached to one of said intermediate wall or said top wall such that three of said supports are coupled to each of said intermediate and top walls.

18. The cat perching and scratching device as in claim 6, further including:

a plurality of supports each comprising a bar having a first end coupled to the pole and a second end attached to one of said intermediate walls or said top wall such that three of said supports are coupled to each of said intermediate and top walls.

19. A cat perching and scratching device comprising:

a base having a generally circular shaped top surface, said base having a diameter generally between 2 ½ feet and 3 feet;

a pole having a first end coupled to said base such that said pole extends upwardly from said base, said pole having a longitudinal axis orientated generally perpendicular to a plane of said top surface of said base and extending through an axis of said base, said pole having a height generally equal to 6 feet;

a top wall having a bottom surface and a top surface, a second end of said pole being attached to said bottom surface of said top wall such that said top wall and said base are orientated generally parallel to each other, said pole being generally centrally located with respect to said bottom surface of said to wall, said top wall having a peripheral edge having a notch therein extending toward a central area of said top wall, said top wall having a diameter generally between 1 foot and 2 feet;

a helical member extending around the pole and having a first end positioned adjacent to said top surface of said base and a second end positioned adjacent to said bottom surface of said top wall, said helical member being substantially rigid, said helical member having a descending radius from said base to said top wall;

a plurality of rods each having a first end attached to said pole and a second end attached to said helical member, said rods being spaced from each other;

a plurality of intermediate walls positioned on said pole between said top wall and said base and being spaced from each other, each of said intermediate walls being generally disc shaped, said pole extending through an axis of each of said intermediate walls, said intermediate walls having a descending radius from lowermost to uppermost with respect to said base such that said uppermost intermediate wall has a diameter greater than said top wall and said lowermost intermediate wall has a diameter smaller than said base, each of said intermediate walls having a perimeter edge having a notch therein, each of said notches extending to said pole, wherein there are two intermediate walls;

cord being wrapped about each of said rods, pole and helical member such that said cord generally covers each of said rods, pole and helical member, said cord comprising a rope material;

a covering being attached to and substantially covering a top surface of said intermediate walls and said top surfaces of said base and top wall, said covering comprising a fibrous material, said fibrous material comprising a carpet material; and a plurality of supports each comprising a bar having a first end coupled to the pole and a second end attached to one of said intermediate walls or said top wall such that three of said supports are coupled to each of said intermediate and top walls.

\* \* \* \* \*